Aug. 17, 1948.  M. F. JACKSON  2,447,340

PACKED JOINT FOR CYLINDER BARRELS

Filed June 14, 1944

INVENTOR
Melvin Jackson
BY Emerson B Donnell
ATTORNEY.

Patented Aug. 17, 1948

2,447,340

UNITED STATES PATENT OFFICE 2,447,340

PACKED JOINT FOR CYLINDER BARRELS

Melvin F. Jackson, Racine, Wis., assignor to J. I. Case Company, Racine, Wis., a corporation of Wisconsin Application June 14, 1944, Serial No. 540,206

1 Claim. (Cl. 285—22)

This invention relates to improvements in engine cylinder liner packing.

In engines using wet cylinder liners, it is necessary to accommodate the expansion of the liner by anchoring it to the cylinder at one point, while leaving the end free to expand with reference to the cylinder jacket. The present invention is concerned with the provision of packing between the liner and the jacket at the point of expansion. It is common practice to make this packing of rubber. However, the packing is inherently exposed in part to mineral oil used for the lubrication of the engine. When mineral oils contact the rubber, the rubber swells and produces extreme variation of the packing pressure. In some instances, the liner is distorted due to such pressure and in other instances the confining flange is broken from the cylinder block.

It is the object of the present invention to provide a packing assembly in which the packing pressure may be maintained more uniform than has heretofore been possible and may be controlled in the design of the packing and will never become excessive to an extent such as to occasion damage. Other objects will appear more fully in connection with a disclosure of the invention.

In the drawings.

Like parts are identified by the same reference characters throughout the several views.

Figure 1:
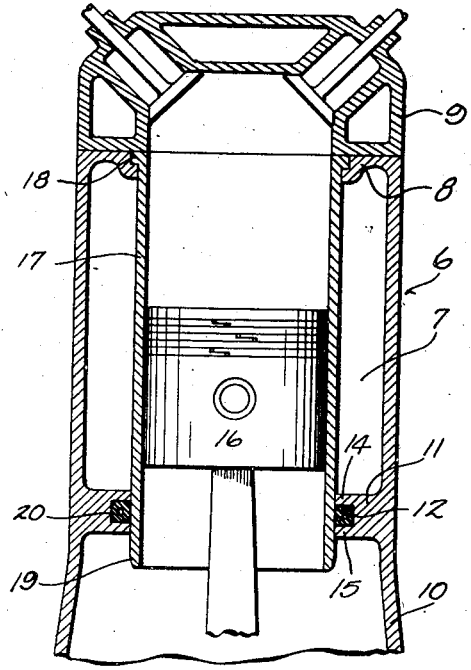
Fig. 1 is a fragmentary view in axial section through a cylinder of an internal combustion engine having a liner packed in accordance with this invention.

The engine cylinder 6 has a jacket space 7 closed at its top by a shoulder flange 8 to which the cylinder head 9 is applied.

At the lower end of the cylinder is a crank case 10 separated from the jacket space 7 by a partition 11 having a channel 12 between two annular flanges 14 and 15.

The piston 16 reciprocates within a liner sleeve 17 having at 18 a peripheral flange engaged between the shoulder of flange 8 and the head 9, whereby the upper end of the liner is fixed. The lower end 19 of the liner is tapered to facilitate its introduction into the annular packing 20 which is positioned within groove 12. This packing serves to confine the water in the jacket space 7 while permitting freedom of expansive and contractive movement of the liner 17 with respect to partition 11.

Figure 3:
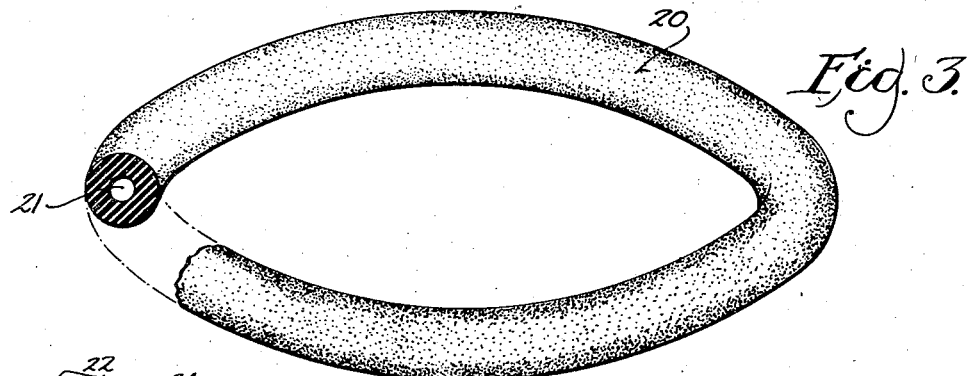
Fig. 3 is a further enlarged view in perspective showing the packing with a portion broken away to illustrate its section prior to its being incorporated in the engine assembly.

It is preferred that in its free state the annular packing 20 should have a circular cross section as indicated at Fig. 3. It is also preferred that in its free state its external diameter should exceed the diameter of the base of the channel 12 in which it is confined. Its section preferably exceeds in diameter the transverse dimension of the channel 12 between the flanges 14 and 15. Its interior diameter is preferably less than the external diameter of the liner 17 which must extend therethrough.

Figure 2:
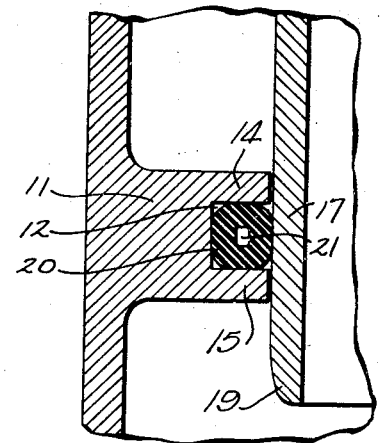
Fig. 2 is an enlarged fragmentary detail view of the packing.

Since all the cross sectional dimensions of the packing annulus 20 exceed the cross sectional dimensions of the channel 12, as closed by liner 17, it will be apparent that when the packing is forced into the channel 12 and the liner 17 is forced through the packing, the packing will necessarily be distorted within the channel in the manner clearly shown by comparison of Fig. 2 with Fig. 3. The sides of the annular packing in each transverse section will be flattened and the degree of flattening will determine in part, the initial pressure exerted by the packing against the walls of the confining channel and against the liner.

It should be understood that the cross-section of channel 12 need not necessarily be rectangular, the rectangular cross-section being chosen as the preferred form, but triangular, trapezoidal, or other cross-sections for this channel are contemplated as within the scope of the invention.

As already explained, the packing is exposed to lubricating oil such, for example, as is present in the crank case 10 and which oil inevitably seeps through the joint between liner 17 and flange 15 into contact with the packing. In the presence of such oil, rubber expands. In order to limit and control the resulting expansion, I provide my improved packing with at least one void in the form of a central annular duct at 21 within the closed packing ring 20. As the rubber swells in contact with the oil, the duct 21 accommodates uniform expansion inwardly and the duct may be made of such size with reference to the given hardness and quality of the rubber as to accommodate all of the possible expansion. This will preclude any possibility that the packing may develop pressure such as to injure the liner or the flanges of partition 11.

While synthetic rubbers have more resistance to oil than natural rubber, the problem is only partially solved by the use of synthetic rubber. Accordingly, if the rubber used is synthetic, the pressures expected to be developed in the packing can be controlled by the use of a smaller bore at 21 than would be required if the packing were made of natural rubber. In every case, depending on the character or quality of the rubber, the pressure may be regulated within permissible limits by predetermining the ratio of the volume of rubber in the packing ring to the volume of the space or spaces provided within the packing itself.

Figures 4, 5:
Figs. 4 and 5 are detail views in transverse section showing modified packing structures.

There may be a number of bores instead of only one, this being indicated at 22 in Fig. 4. It is even possible to make the packing ring of sponge rubber, as indicated at 23 in Fig. 5, provided that voids 24 are sealed, at least externally, by an impervious skin at 25 to close off any channels of communication such as might destroy the effect of the packing in sealing off the jacket 7 from the crank case 10. In the construction of a sponge rubber packing such as that shown at 23, it is also possible to regulate pressures by predetermining the volume of rubber to the volume of the voids.

A packing ring having an internal void or voids into which the material of the ring can expand under compression permits adequate sealing pressure to be developed in the first instance, upon assembly of the parts, while precluding such pressure from rising dangerously as the rubber expands in the presence of the oil to which it is subject. It is preferred not only that the voids shall be wholly within the rubber of the packing ring, but that they shall be sealed against external communication of any kind. If the voids opened outwardly, additional rubber surface would be exposed to possible oil contact. It is also preferred that the means providing the voids shall be such that the ratio of rubber to the voids shall be substantially or approximately uniform throughout the annular ring, this being true in each of the three embodiments disclosed.

No claim is made to any method of producing the packing rings disclosed, as they may be manufactured in a variety of ways. The ring of Fig. 3 may be made of two channels independently separately molded and welded together. The rings of Figs. 3 and 4 may be made of sections prefabricated as tubes, bent into annular form and welded together at their initially free ends. The device of Fig. 5 may be made either by so molding the sponge rubber as to provide it with the peripheral skin at 25 or by molding or cutting an annulus of sponge rubber and subsequently coating it with rubber to provide the desirable peripheral skin.

I claim:

A seal for closing the space between two telescoped tubular members to prevent mingling of oil or oil vapors retained on one side of the seal and water retained on the other side thereof, comprising spaced frangible side walls projecting from one of said members into close proximity to the other member, and an annular ring of rubber substantially filling the space between said walls and members, said rubber ring being provided internally thereof with substantial void space distributed annularly and being of sufficient volume to absorb the swelling of said rubber ring under the influence of oil or oil vapors acting thereon, whereby breakage of said side walls and distortion of said tubular members due to swelling of the rubber is avoided.

MELVIN F. JACKSON.

REFERENCES CITED

The following references are of record in the file of this patent:

UNITED STATES PATENTS

| Number | Name | Date |
| --- | --- | --- |
| 1,583,955 | Bull | May 11, 1926 |
| 1,593,009 | Bigler | July 20, 1926 |
| 1,674,832 | Lugt | June 26, 1928 |
| 1,764,739 | Meyer | June 17, 1930 |
| 1,976,589 | Trickey | Oct. 9, 1934 |
| 2,023,268 | Dodge | Dec. 3, 1935 |
| 2,111,828 | Weaver et al. | Mar. 22, 1938 |
| 2,121,827 | Roberts | June 28, 1938 |
| 2,259,940 | Nathan | Oct. 21, 1941 |

FOREIGN PATENTS

| Number | Country | Date |
| --- | --- | --- |
| 126,330 | Great Britain | 1919 |